United States Patent
Stein et al.

(10) Patent No.: US 9,844,296 B2
(45) Date of Patent: Dec. 19, 2017

(54) BEVERAGE BREWING DEVICE

(71) Applicant: HELEN OF TROY LIMITED, Belleville, St. Michael (BB)

(72) Inventors: Benjamin Stein, Chicago, IL (US); Jens Johnson, Austin, TX (US); Morris Elijah Worden, IV, New York, NY (US); Alistair Douglas Bramley, Brooklyn, NY (US); Davin Stowell, New York, NY (US); Paul Katz, Palo Alto, CA (US)

(73) Assignee: Helen of Troy Limited, Belleville, St. Michael (BB)

( * ) Notice: Subject to any disclaimer, the term of this patent is extended or adjusted under 35 U.S.C. 154(b) by 0 days.

(21) Appl. No.: 14/612,809

(22) Filed: Feb. 3, 2015

(65) Prior Publication Data
US 2015/0257588 A1    Sep. 17, 2015

Related U.S. Application Data

(60) Provisional application No. 61/950,884, filed on Mar. 11, 2014.

(51) Int. Cl.
*A47J 31/06* (2006.01)
*A47J 31/46* (2006.01)

(52) U.S. Cl.
CPC .................. *A47J 31/462* (2013.01)

(58) Field of Classification Search
CPC ................................... A47J 31/462
USPC ......... 99/300, 305, 285, 299, 286, 282, 283, 99/288, 289; 426/433, 115, 279, 299, 426/287
See application file for complete search history.

(56) References Cited

U.S. PATENT DOCUMENTS 2,589,783 A    3/1952    Crossley et al.
2,676,531 A    4/1954    Popeil
(Continued)

FOREIGN PATENT DOCUMENTS

DE          493328         3/1930
WO      2012/158798      11/2012
WO    WO 2012158798 A2 *  11/2012    .......... A47J 31/0605

OTHER PUBLICATIONS

International Search Report filed in PCT/US2015/014231 dated May 8, 2015.

*Primary Examiner* — Phuong Nguyen
(74) *Attorney, Agent, or Firm* — Rankin, Hill & Clark LLP

(57) ABSTRACT

A beverage brewing device includes a water tank, a base, a filter, a plug assembly, and an actuator mechanism. The base supports the water tank above a support surface. The plug assembly connects with the water tank and is operable between an open operating position in which water can flow from the water tank through the plug assembly and a closed operating position in which water is precluded from flowing through the plug assembly. The actuator mechanism is movable between a first operating position and a second operating position. The actuator mechanism is cooperates with the plug assembly such that when in the first operating position the plug assembly is in the closed operating position and when in the second operating position the plug assembly is in the open operating position. The actuator mechanism includes an operator actuated surface that is accessible from an exterior of the base.

18 Claims, 5 Drawing Sheets

(56) References Cited

U.S. PATENT DOCUMENTS

| | | | |
|---|---|---|---|
| 5,826,493 A * | 10/1998 | Tien Lin | A47J 31/061 |
| | | | 99/299 |
| 5,862,739 A | 1/1999 | Lin | |
| 6,164,191 A * | 12/2000 | Liu | A47J 31/0573 |
| | | | 99/285 |
| 6,681,960 B2 | 1/2004 | Garman | |
| 2004/0025705 A1 | 2/2004 | Li | |
| 2012/0067221 A1 | 3/2012 | Krul et al. | |
| 2013/0101715 A1 * | 4/2013 | Geissler | A47J 31/3676 |
| | | | 426/431 |
| 2013/0247776 A1 * | 9/2013 | Smit | A47J 31/44 |
| | | | 99/299 |
| 2014/0072689 A1 * | 3/2014 | Ho | A47J 31/0605 |
| | | | 426/569 |

* cited by examiner

BEVERAGE BREWING DEVICE

BACKGROUND

Cold brew coffee devices are known to include a water tank that rests on a carafe. The water tank includes an opening and a stopper is inserted into the opening from outside the bottom of the water tank. A dampened filter is inserted into the bottom of the water tank, and then water and ground coffee is placed into the water tank. The water and coffee are then allowed to steep for 12 to 18 hours. After steeping, the stopper is then removed and the water tank is placed over a carafe, which allows the brewed beverage to flow from the water tank into the carafe.

These known cold brew coffee devices require the operator to carefully remove the stopper from the water tank and quickly place the water tank over the carafe. This action can be difficult.

SUMMARY

A beverage brewing device that can overcome the aforementioned shortcomings includes a water tank, a base, a filter, a plug assembly, and an actuator mechanism. The base is configured to cooperate with the water tank to support the water tank above a support surface. The filter connects with the water tank. The plug assembly connects with the water tank and is operable between an open operating position in which water can flow from the water tank through the plug assembly and a closed operating position in which water is precluded from flowing through the plug assembly. The actuator mechanism is movably connected with the base. The actuator mechanism is movable between a first operating position and a second operating position. The actuator mechanism is configured to cooperate with the plug assembly such that when in the first operating position the plug assembly is in the closed operating position and when in the second operating position the plug assembly is in the open operating position. The actuator mechanism includes an operator actuated surface that is accessible from an exterior of the base and is engaged by an operator for moving the actuator mechanism between the first operating position and the second operating position.

In the above beverage brewing device, the water tank includes a lower wall having a lower opening. The plug assembly is removably connected with the water tank at the lower opening. More specifically, the plug assembly threadably connects with the water tank. The water tank includes an outer lower annular flange configured to cooperate with the base to properly locate the water tank on the base.

In the above mentioned device, the plug assembly includes a valve movable between an open position and a closed position. The actuator mechanism includes an arm configured to contact the valve. The arm contacts the valve and maintains the valve in the open position when the actuator mechanism is in the second operating position. The valve is biased toward the closed position. The device further includes a spring connected with the arm for biasing the actuator mechanism toward the first operating position and the second operating position. The actuator mechanism includes the arm and an axle. The arm pivots about the axle and translates with respect to the base when moving the actuator mechanism from the first operating position toward the second operating position.

The beverage brewing device further includes a carafe. The actuator mechanism includes a locking flange configured to cooperate with the carafe to inhibit removal of the carafe from beneath the water tank when the actuator mechanism is in the second operating position. The locking flange is positioned above an upper edge of the carafe when the actuator mechanism is in the first operating position and the carafe is positioned beneath the plug assembly to receive water flowing through the plug assembly. The locking flange is positioned below the upper edge of the carafe when the actuator mechanism is in the second operating position and the carafe is positioned beneath the plug assembly to receive water flowing through the plug assembly. The locking flange is configured such that when the actuator mechanism is in the second operating position and a force is applied to the locking flange by the carafe in a direction to remove the carafe from beneath the water tank, the actuator mechanism is urged toward the first operating position.

In the above brewing device, the base includes an outer side wall having a slot. The actuator mechanism includes a handle that extends through the slot and a hand grip. The hand grip, which defines the operator actuated surface, connects with the handle. The hand grip moves downward from a first position, which is when the actuator mechanism is in the first operating position, toward a second position, which is when the actuator mechanism is in the second operating position. The hand grip connects with an arm which is biased to place the actuator mechanism in either the first operating position or the second operating position depending on a location of the hand grip with respect to the base.

A method for making a beverage includes inserting coffee grounds into a water tank, placing water into the water tank with the coffee grounds, placing the water tank on a base, placing a carafe beneath the water tank, and moving the handle grip from a first position to a second position. The water tank has a lower opening that is opened and closed with a plug assembly. Moving the handle grip from the first position to the second position opens the plug assembly and allows a brewed beverage to flow from the water tank into the carafe through the plug assembly.

Moving the handle grip in the above method further includes moving the handle grip downwardly from the first position toward the second position. Moving the handle grip further includes pivoting and translating the handle grip with respect to the base when moving the handle grip from the first position towards the second position. Moving the handle grip further includes moving a locking flange connected with the handle grip below an upper edge of the carafe when moving the handle grip from the first position towards the second position. The method further includes removing the carafe from beneath the water tank with the handle grip in the second position and contacting the locking flange. The method further includes moving the locking flange until the handle grip is biased towards the first position and the locking flange then resides above the upper edge of the carafe.

DETAILED DESCRIPTION

Figure 1:
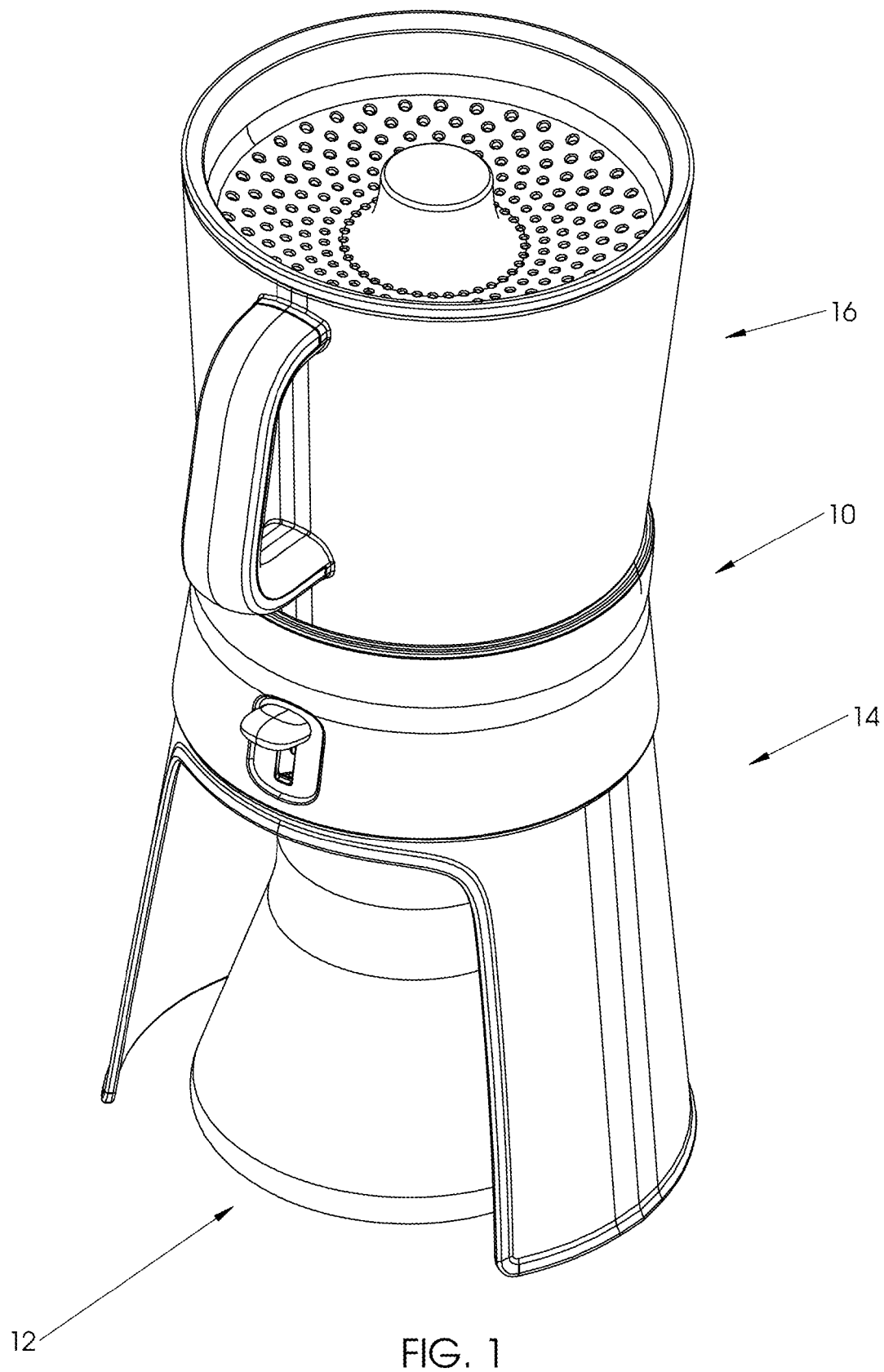
FIG. 1 is a perspective view of a beverage brewing device.
Figure 2:
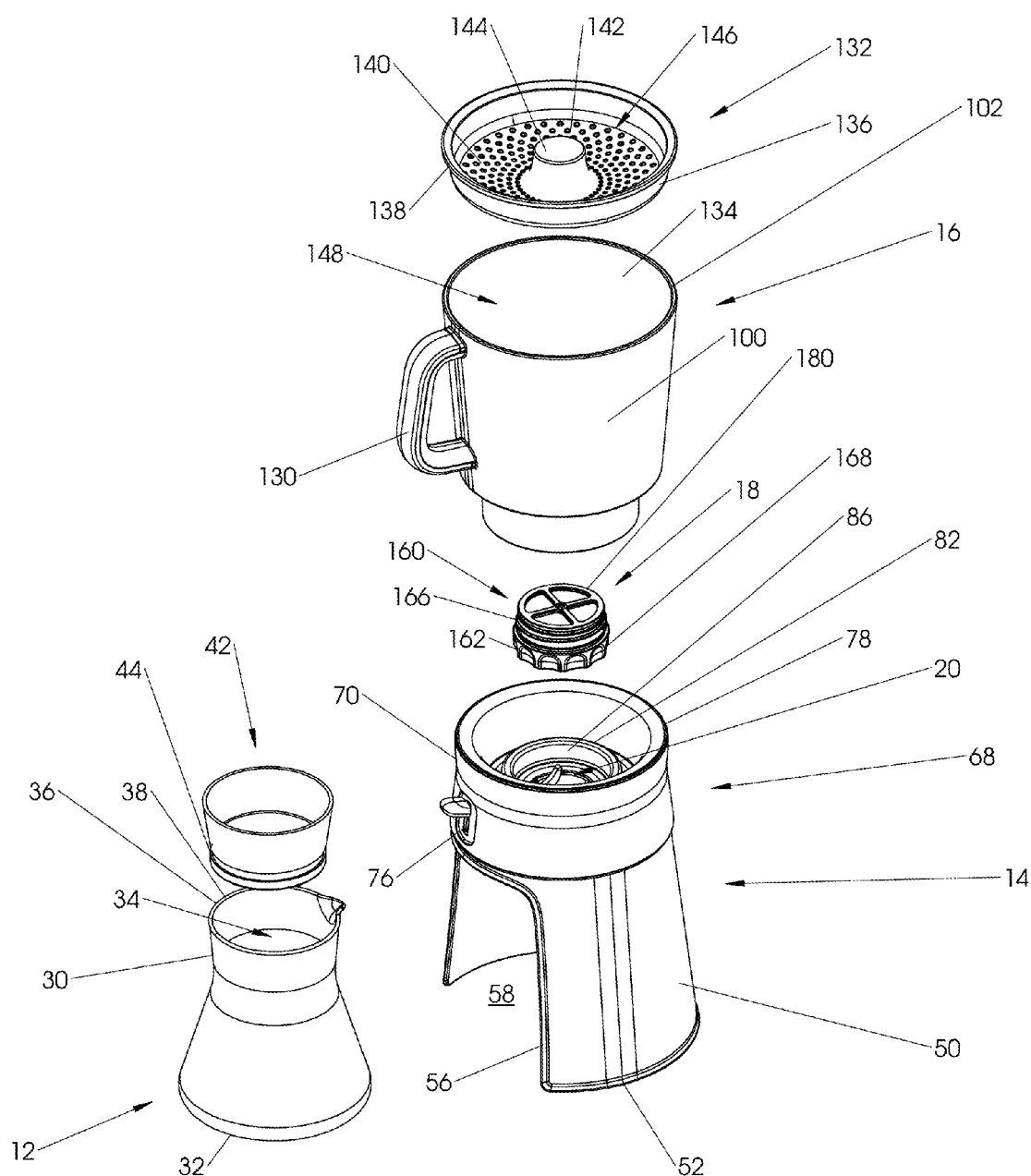
FIG. 2 is an exploded view of the beverage brewing device depicted in FIG. 1.

FIG. 1 depicts a beverage brewing device 10 (hereinafter brewing device) including a carafe 12, a base 14, and a water tank 16. With reference to FIG. 2, the brewing device 10 further includes a plug assembly 18 and an actuator mechanism 20. The carafe 12 fits in the base 14, which supports the water tank 16. The plug assembly 18 connects with the water tank 16. The actuator mechanism 20 controls the flow of water through the plug assembly 18 into the carafe 12. The brewing device 10 can be useful to cold brew coffee, but is not limited to only this use.

The carafe 12 fits within the base 14 when the brewing device 10 is operating to brew a beverage, which will be described in more detail below. For storage, the carafe 12 also fits into the water tank 16. The carafe 12 includes a side wall 30 formed with and extending upwardly from a base 32 to define a chamber 34, which receives the brewed beverage. The carafe has an upper edge 36 and is wider at the bottom as compared to the upper edge. The upper edge 36 defines an opening 38, which leads to the chamber 34. The upper edge 36 and the side wall 30 adjacent the upper edge are circular, but could take other configurations.

A lid 42 can fit onto the carafe 12. The lid 42 is useful to cover the upper opening 38. A seal 44, which can be similar to an 0-ring gasket, fits around the lid 42 to seal the contents in the chamber 34 of the carafe 12 when desired.

The base 14 is generally frusto-conical in shape. The base 14 is wider at the bottom as compared to the top. The base 14 includes a lower side wall 50 having a bottom edge 52 and a top edge 54. The top edge 54 is circular. The bottom edge 52 is also circular but for a cutout 56 formed in the lower side wall 50 having a height and a width large enough so that the carafe 12 can pass through the cutout. The cutout 56 leads to an internal volume 58, which is surrounded by the side wall 50 with the exception of the area at the cutout 56. The carafe 12 is disposed within the internal volume 58 during the brewing operation. The base 14 is also open at the bottom such that the carafe 12 and the base 14 rest on the same support surface, such as a table or kitchen countertop, during the brewing operation.

Figure 3:
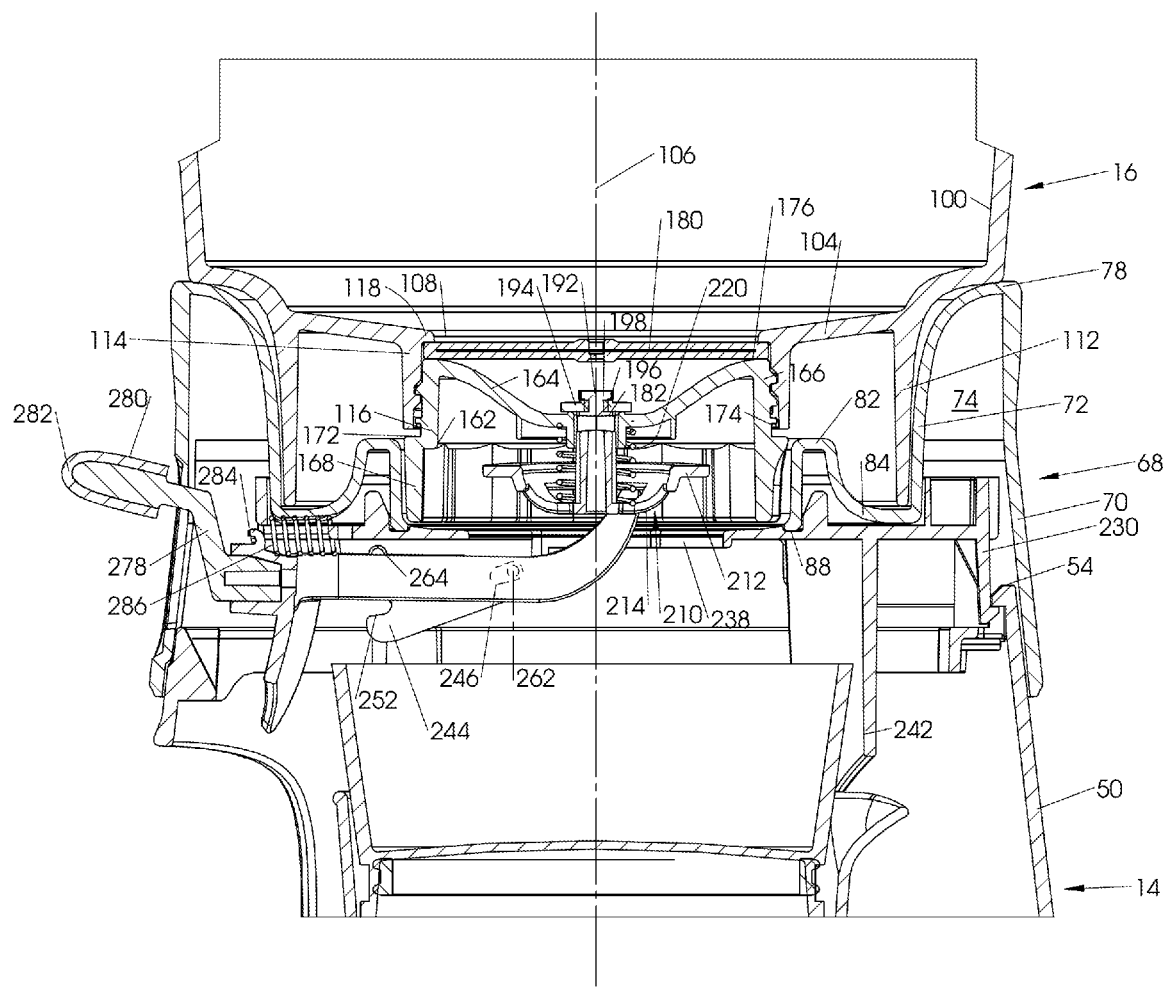
FIG. 3 is a cross-sectional view depicting an actuator mechanism of the beverage brewing device in a first operating position.

The base 14 also includes an actuator housing 68. The actuator housing 68 is similarly frusto-conical in configuration. With reference to FIG. 3, the actuator housing 68 includes an outer side wall 70 connected with an inner side wall 72 to define a void 74 between them. The outer side wall 70 fits over the lower side wall 50 of the base 14 to connect the lower side wall 50 with the actuator housing 68. The outer side wall 70 also includes a slot 76 to accommodate the actuator mechanism 20 in a manner described in more detail below. The inner side wall 72 connects with the outer side wall 70 at an upper edge 78 of the base 14. The actuator housing 68 also includes an annular boss 82 that extends upwardly from a floor 84 of the actuator housing 68. The annular boss 82 defines a central hole 86 in the actuator housing 68. The annular boss 82 also terminates at a lower circular edge 88.

With reference back to FIG. 2, the water tank 16 includes a side wall 100 and is generally frusto-conical in shape. The side wall 100 defines a circular top edge 102 of the water tank 16. With reference to FIG. 3, the water tank 16 also includes a lower wall 104 that slopes toward a central axis 106, which is also a central axis for the brewing device 10.

The lower wall 104 includes a central opening 108 and is sloped toward the central opening. The water tank 16 also includes an outer lower annular flange 112 that is offset radially inward from the side wall 100. The outer lower annular flange 112 operates as a locator and cooperates with the inner side wall 72 of the actuator housing 68, which is part of the base 14, to properly locate the water tank 16 on the base 14. The water tank 16 also includes an inner lower annular flange 114 that is offset radially inwardly from the outer lower annular flange 112. The inner lower annular flange 114 surrounds the central opening 108 and is internally threaded so as to cooperate with the plug assembly 18. The inner lower annular flange 114 terminates at a circular lower edge 116. A circular lip 118 is provided at an upper end of the inner lower annular flange 114 and extends inwardly into the central opening 108 to cooperate with the plug assembly 18.

With reference back to FIG. 2, the water tank 16 also includes a handle 130. The handle 130 connects with the side wall 100 of the water tank 16 to make it easier to maneuver the water tank. A lid 132 fits onto the water tank 16 so as to cover an upper opening 134 of the water tank 16. The lid 132 includes a cylindrical side wall 136, which is slightly smaller in diameter than the side wall 100 adjacent the upper end 102. A circular flange 138 extends outwardly from the cylindrical side wall 136. The cylindrical flange 138 rests on the upper edge 102 when the lid 132 is placed onto the water tank 16. The lid 132 also includes a base wall 140 having a plurality of openings 142. A central pedestal 144 is provided to facilitate gripping the lid 132 to remove the lid from the water tank 16. The lid 132 defines a recess 146. Water is poured into the recess 146 and passes through the openings 142 before traveling into the chamber 148 of the water tank 16. By providing a plurality of openings 142, the introduction of water into the internal chamber 148 is retarded, which can be beneficial during a cold brew process.

With reference to FIG. 2, the plug assembly 18 includes a housing 160, which is generally cylindrical in configuration. With reference to FIG. 3, the housing 160 includes a cylindrical outer wall 162 formed with a sloped inner wall 164 that slopes toward the central axis 106. The cylindrical outer wall 162 includes a threaded upper section 166 that threads into the inner lower annular flange 114 of the water tank 16. The cylindrical outer wall 162 also includes a lower section 168 that is scalloped, which is more clearly visible in FIG. 2. A step 172 is provided between the upper section 166 and the lower section 168. The step 172 is circular in a cross section taken normal to the central axis 106. A gasket 174 surrounds the cylindrical outer wall 162 above the step 172 so as to be sandwiched between the lower end 116 of the inner lower annular flange 114 and the step 172 when the plug 18 is threaded into the water tank 16.

The cylindrical outer wall 162 transitions into the sloped inner wall 164 along an upper edge 176 of the housing 160. A filter 180, which is disc-shaped in the illustrated embodiment, rests on the upper edge 176, which is circular. The filter 180 is sandwiched between the lip 118 and the upper edge 176 of the housing 160 when the plug assembly 18 is threaded into the inner lower annular flange 114 of the water tank 16. The filter 180 is spaced from a section of the sloped inner wall 164 surrounding a central hole 182 through the sloped inner wall. The central hole 182 is coaxial with the central axis 106.

The plug assembly 18 is operable between an open operating position in which water can flow from the water tank through the plug assembly and a closed operating position in which water is precluded from flowing through the plug assembly. The plug assembly 18 includes a valve 190 located in the plug assembly housing 160. With reference to FIG. 3, the valve 190 includes a stem 192 coaxial with the central axis 106. A seal 194 having an opening 196 connects at an upper end 198 of the stem 192. The seal 194 is substantially disc-shaped so as to selectively cover the central hole 182 to preclude the passage of liquid through the central hole 182. The valve 190 also includes a base 210 connected with the stem 192. The base 210 includes a circular flange 212 and a plurality of spokes 214 that connect the flange 212 with the stem 192. The spokes 214 define openings 216 through the base 210. The valve 190 also includes a spring 220. The spring 220 biases the seal 194 toward the central hole 182.

Figure 4:
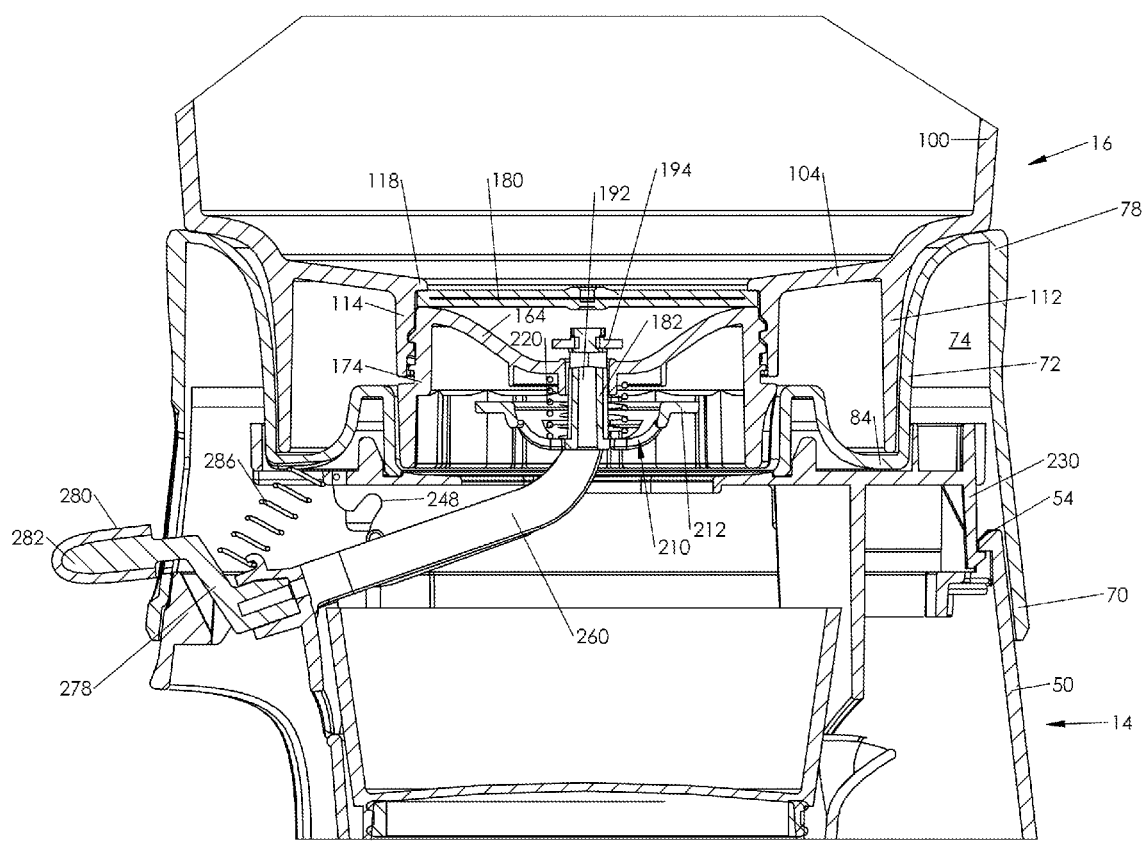
FIG. 4 is a cross-sectional view showing the actuating mechanism in a second operating position.
Figure 5:
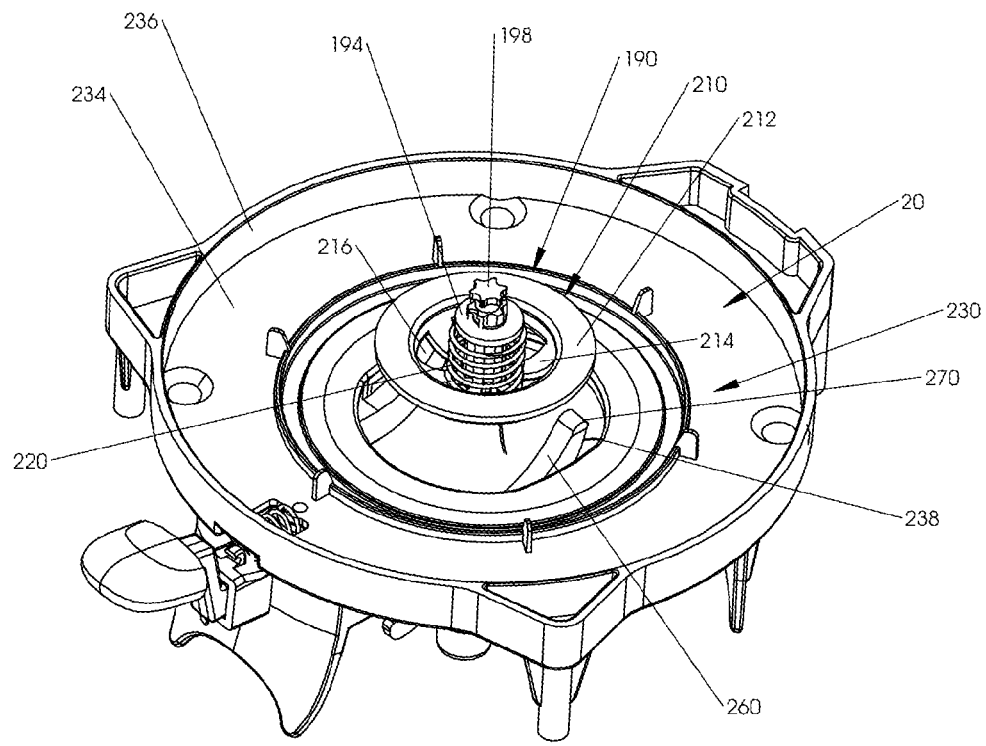
FIG. 5 is a perspective view of the actuator mechanism.
Figure 6:
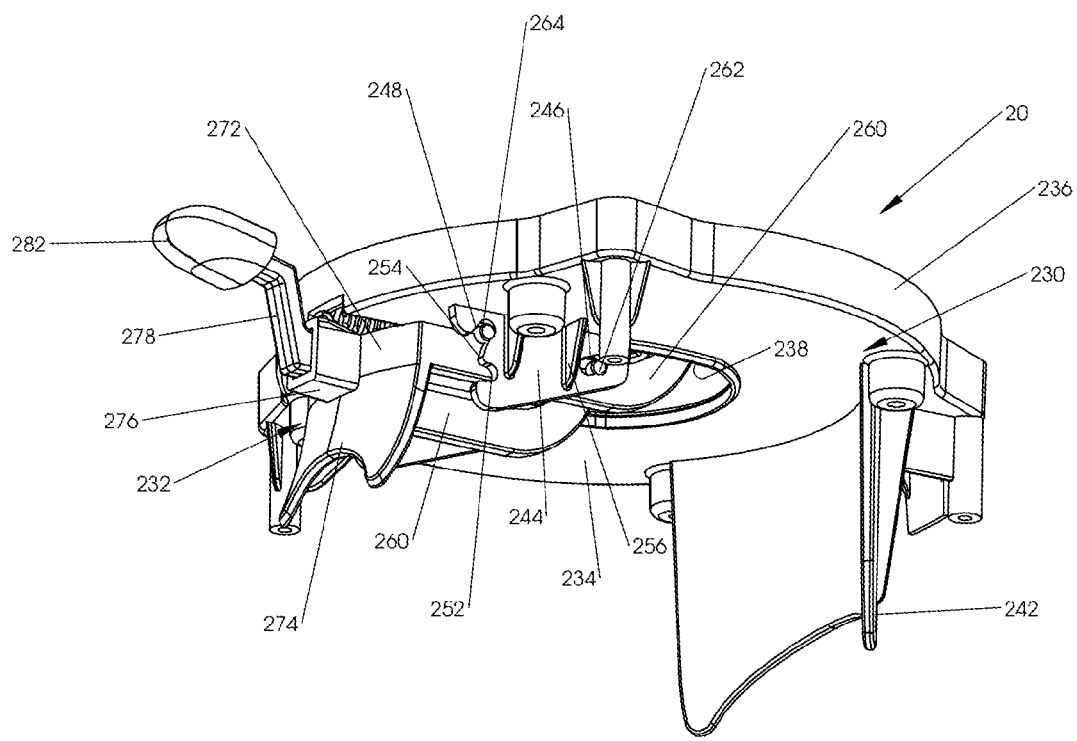
FIG. 6 is a lower perspective view of the actuator mechanism

The actuator mechanism 20 is movably connected with the base 14. The actuator mechanism 20 is movable between a first operating position (see FIG. 3) and a second operating position (see FIG. 4). The actuator mechanism 20 cooperates with the plug assembly 18 such that when in the first operating position the plug assembly is in the closed operating position and when in the second operating position the plug assembly is in the open operating position. With reference to FIGS. 5 and 6, the actuator mechanism 20 includes a bracket 230 and an actuator 232. The bracket 230 connects with the actuator housing 68. The bracket 230 includes a plate 234, which can be circular. A circular side wall 236 extends upwardly from the plate 234. The plate includes a central hole 238 that is coaxial with the central axis 106 (FIG. 3). The bracket 230 also includes a carafe locator flange 242 that extends downwardly from the plate 234. The carafe locator flange 242 is curved so as to generally conform to the curvature of the carafe 12 near the upper end 36 of the side wall 30. The carafe locator flange 242 aids in aligning the carafe 12 beneath the opening 238 and with the valve 190 to allow brewed beverage to fall into the carafe 12 from the water tank 16. The bracket 230 also includes a connector flange 244 depending downwardly from the plate 234. In the illustrated embodiment, two connector flanges 244 are provided, but only one is clearly visible in FIG. 6. The other connector flange 244 is visible in FIG. 3 and is on an opposite side of the actuator 232 as that shown in FIG. 6. Each connector flange 244 is similar in configuration. Each connector flange 244 includes a slot 246, which allows for pivotal attachment of the actuator 232 to the bracket 230. Each connector flange 244 also includes an upper notch 248 and a lower notch 252 separated by a camming surface 254. Gussets 256 extend perpendicularly from each connector flange 244 to provide rigidity.

The actuator 232 includes two arms 260 in the illustrated embodiment. Each arm 260 is similar in configuration. Axles 262 (only one of which is visible in FIG. 6) extend outwardly from each arm 260 and are received in a respective slot 246 in the connector flange 244. The slot 246 and the axle 262 are also shown in phantom in FIG. 3. The axle 262 can translate, or slide, within the slot 246 and pivot about a pivot axis defined by the axle 262. The actuator 232 also includes posts 264: one on each arm 260. The posts 264 extend outwardly from the arms 260 in the same manner as the axles 262. The posts 264 are receivable in the notches 248 and 252 formed in the connector flanges 244.

As more clearly seen in FIG. 3, each of the arms 260 is curved so as to extend through the opening 238 in the bracket 230. Each arm 260 terminates at a distal end 270, which is configured to cooperate with the circular flange 212 on the base 210 of the valve 190.

The actuator 232 also includes a connector 272, which connects the arms 260. A locking flange 274 extends downwardly from the connector 272. The locking flange 274 cooperates with the carafe 12 to inhibit removal of the carafe during the brewing operation. The locking flange 274 can also urge the carafe 12 toward the carafe locator flange 242 when the actuator 232 is moved from a first position (FIG. 3) toward a second position (FIG. 4). A socket 276 is provided on the connector 272. A handle 278 that extends through the slot 76 (FIG. 2) of the actuator housing 68 is received in the socket 276. The actuator mechanism 20 includes an operator actuated surface 280 that is accessible from an exterior of the base 14 and is engaged by an operator for moving the actuator mechanism between the first operating position and the second operating position. A handle grip 282, which defines the operator actuated surface 280 in the illustrated embodiment, connects with the handle 278.

In the illustrated embodiment, the handle grip 282 moves downward from a first position (FIG. 3), which is when the actuator mechanism is in the first operating position, toward a second position (FIG. 4), which is when the actuator mechanism is in the second operating position. With reference to FIG. 3, the actuator 232 includes a hook 284. A tension spring 286 connects with the hook 284 and with the bracket 230. The tension spring 286 biases the actuator until the posts 264 are received in one of the two slots 248, 252 of the connector flange 244.

In operation, one threads the plug assembly 18 into the water tank 16. Coffee grounds are inserted into the chamber 148 of the water tank 16. The lid 132 is then placed onto the water tank 16. Water is poured onto the lid 132 and passes through the openings 142. The water and the coffee grounds remain in the water tank 16 for a predetermined amount of time, such as several hours, while the seal 194 covers the central hole 182 through the plug assembly 18 so that the water and coffee grounds mixture remains in the water tank 16. When it is desired to drink the beverage, the carafe 12 without the lid 42 is placed within the internal volume 58 of the base 14. The handle grip 282 is then pressed downwardly from the first position (the location shown in FIG. 2) to the second position (the location shown in FIG. 4). With reference to FIG. 3, the actuator 232 is shown in the first operating state, which is the same as the state shown in FIGS. 1 and 2. When the handle grip 282 is pressed downwardly, the axle 262 slides within the slot 246 (down and to the right in FIG. 3) and the post 264 rides over cammed surface 254 as the post 264 moves from the upper notch 248 to the lower notch 252. The spring 286 stretches and then returns pulling the post 264 into the lower notch 252. At this time, the distal ends 270 of the arms 260 engage the circular flange 212 on the base 210 of the valve 190 pushing the seal 194 away from the opening 182 against the biasing force of the spring 220. This allows water to pass through the opening 182 and into the carafe 12. As seen in FIG. 4, the locking flange 274 extends downwardly beneath the upper edge 30 of the carafe 12. As such, removal of the carafe 12 is impeded by the locking flange. If the carafe 12 is removed, a force is applied to the locking flange 274 so that the post 264 is removed from the lower slot 252 and is pulled toward the upper slot 248, which results in the valve closing. This reduces the likelihood of an inadvertent dispensing of beverage from the water tank 16.

To store the brewing device 10, the base 14 is flipped upside down from the configuration shown in FIG. 2. As such, the upper edge 78 now rests on the support surface. The water tank 16 is then inserted into the internal volume 58 with the outer lower annular flange 112 resting against the actuator housing 68. The carafe 12 can then be inserted into the water tank 16 and the lid 132 can be inverted or flipped from the configuration shown in FIG. 2 and still rest on the upper edge 102 of the water tank 16. This provides a nested configuration for storage and shipment of the brewing device 10.

A brewing device has been described above with particularity. Modifications and alterations will occur to those upon reading and understanding the preceding detailed description. The invention, however, is not limited to only the brewing device described above. Instead, the invention is broadly defined by the appended claims and the equivalents thereof. Also, various presently unforeseen or unanticipated alternatives, modifications, variations or improvements may be subsequently made by those skilled in the art which are also intended to be encompassed by the following claims.

The invention claimed is:

1. A beverage brewing device comprising:
    a water tank;
    a base configured to cooperate with the water tank to support the water tank above a support surface;
    a filter connected with the water tank;
    a plug assembly connected with the water tank and operable between an open operating position in which water can flow from the water tank through the plug assembly and a closed operating position in which water is precluded from flowing through the plug assembly; and
    an actuator mechanism movably connected with the base, the actuator mechanism being movable between a first operating position and a second operating position, the actuator mechanism is configured to cooperate with the plug assembly such that when in the first operating position the plug assembly is in the closed operating position and when in the second operating position the plug assembly is in the open operating position, wherein the actuator mechanism includes an operator actuated surface that is accessible from an exterior of the base and is engaged by an operator for moving the actuator mechanism between the first operating position and the second operating position,
    wherein the water tank includes a lower wall having a lower opening, and the plug assembly includes a housing removably connected with the water tank beneath the lower wall and at the lower opening, the housing including an upper wall with a central hole coaxial with the lower opening,
    wherein the plug assembly includes a valve located in the plug assembly housing and having a seal configured to cover the central hole, the valve movable between an open position allowing the passage of water through the central hole and a closed position precluding the passage of water through the central hole, and the actuator mechanism is separate from the plug assembly and is configured to directly contact the valve and maintain the valve in the open position when the actuator mechanism is in the second operating position.

2. The device of claim 1, wherein the plug assembly threadably connects with the water tank.

3. The device of claim 1, wherein the water tank includes an outer lower annular flange configured to cooperate with the base to properly locate the water tank on the base.

4. The device of claim 1, wherein the actuator mechanism includes an arm configured to contact the valve, wherein the arm contacts the valve and maintains the valve in the open position when the actuator mechanism is in the second operating position.

5. The device of claim 4, wherein the valve is biased toward the closed position.

6. The device of claim 5, further comprising a spring connected with the arm for biasing the actuator mechanism toward the first operating position and the second operating position.

7. The device of claim 5, wherein the actuator mechanism includes the arm and an axle, wherein the arm pivots about the axle and translates with respect to the base when moving the actuator mechanism from the first operating position toward the second operating position.

8. The device of claim 7, wherein the actuator mechanism includes a post extending from the arm and a flange having an upper notch and a lower notch, wherein the post is received in the upper notch when the actuator mechanism is in the first operating position and the post is received in the lower notch when the actuator mechanism is in the second operating position.

9. The device of claim 1, further comprising a carafe, wherein the actuator mechanism includes a locking flange configured to cooperate with an upper edge of the carafe to inhibit removal of the carafe from beneath the water tank when the actuator mechanism is in the second operating position.

10. The device of claim 9, wherein the locking flange is positioned above the upper edge of the carafe when the actuator mechanism is in the first operating position and the carafe is positioned beneath the plug assembly to receive water flowing through the plug assembly, and the locking flange is positioned below the upper edge of the carafe when the actuator mechanism is in the second operating position and the carafe is positioned beneath the plug assembly to receive water flowing through the plug assembly.

11. The device of claim 10, wherein the locking flange is configured such that when the actuator mechanism in the second operating position and a force is applied to locking flange by the carafe in a direction to remove the carafe from beneath the water tank, the actuator mechanism is urged toward the first operating position.

12. The device of claim 1, wherein the base includes an outer side wall having a slot, wherein the actuator mechanism includes a handle that extends through the slot and a hand grip, which defines the operator actuated surface, connects with the handle.

13. The device of claim 12, wherein the hand grip moves downward from a first position, which is when the actuator mechanism is in the first operating position, toward a second position, which is when the actuator mechanism is in the second operating position.

14. The device of claim 13, wherein the hand grip connects with an arm which is biased to place the actuator mechanism in either the first operating position or the second operating position depending on a location of the hand grip with respect to the base.

15. A beverage brewing device comprising:
    a water tank including a lower wall having a lower opening;
    a base configured to cooperate with the water tank to support the water tank above a support surface;
    a filter connected with the water tank;
    a plug assembly connected with the water tank and operable between an open operating position in which water can flow from the water tank through the plug assembly and a closed operating position in which water is precluded from flowing through the plug assembly, the plug assembly including a housing removably connected with the water tank beneath the lower wall and at the lower opening and having an upper wall, and the filter which is separate from both the water tank and the plug assembly is sandwiched between the upper wall of the housing and the lower wall of the water tank; and an actuator mechanism movably connected with the base, the actuator mechanism being movable between a first operating position and a second operating position, the actuator mechanism is configured to cooperate with the plug assembly such that when in the first operating position the plug assembly is in the closed operating position and when in the second operating position the plug assembly is in the open operating position, wherein the actuator mechanism includes an operator actuated surface that is accessible from an exterior of the base and is engaged by an operator for moving the actuator mechanism between the first operating position and the second operating position.

16. The device of claim 15, wherein the plug assembly housing threadably connects with the water tank.

17. The device of claim 15, further comprising a carafe, wherein the actuator mechanism includes a locking flange and a carafe locating flange, the locking flange configured to cooperate with the carafe to inhibit removal of the carafe from beneath the water tank when the actuator mechanism is in the second operating position and urge the carafe toward the carafe locating flange when the actuator mechanism is moved from the first operating position toward the second operating position.

18. The device of claim 17, wherein the locking flange is positioned above an upper edge of the carafe when the actuator mechanism is in the first operating position and the carafe is positioned beneath the plug assembly to receive water flowing through the plug assembly, and the locking flange is positioned below the upper edge of the carafe when the actuator mechanism is in the second operating position and the carafe is positioned beneath the plug assembly to receive water flowing through the plug assembly.

* * * * *